(12) United States Patent
Tanaka

(10) Patent No.: US 7,775,922 B2
(45) Date of Patent: Aug. 17, 2010

(54) TENSION ADJUSTING DEVICE FOR ENGINE ACCESSORY DRIVING BELT

(75) Inventor: Tadahisa Tanaka, Iwata (JP)

(73) Assignee: NTN Corporation, Osaka (JP)

( * ) Notice: Subject to any disclaimer, the term of this patent is extended or adjusted under 35 U.S.C. 154(b) by 751 days.

(21) Appl. No.: 10/582,405

(22) PCT Filed: Dec. 16, 2004

(86) PCT No.: PCT/JP2004/018818

§ 371 (c)(1),
(2), (4) Date: Apr. 24, 2007

(87) PCT Pub. No.: WO2005/059405

PCT Pub. Date: Jun. 30, 2005

(65) Prior Publication Data

US 2008/0020876 A1    Jan. 24, 2008

(30) Foreign Application Priority Data

Dec. 16, 2003  (JP) .............................. 2003-418061

(51) Int. Cl.
  *F16H 7/22*   (2006.01)
  *F16H 7/08*   (2006.01)
(52) U.S. Cl. ...................................... 474/110
(58) Field of Classification Search ................. 474/110, 474/109, 101, 103, 111, 115, 117, 133, 134, 474/135, 138; 384/276, 129, 416
See application file for complete search history.

(56) References Cited

U.S. PATENT DOCUMENTS 95,194 A  *  9/1869  Chubb ........................ 384/416

(Continued)

FOREIGN PATENT DOCUMENTS

CA   1 075 185    4/1980

(Continued)

OTHER PUBLICATIONS

First Office Action issued Feb. 1, 2008 by the Chinese Patent Office in Chinese Application No. 20040037633.4, which is a foreign counterpart of the present application (with partial English translation).

(Continued)

*Primary Examiner*—John Q Nguyen
*Assistant Examiner*—Henry Liu
(74) *Attorney, Agent, or Firm*—Wenderoth, Lind & Ponack, LLP.

(57) ABSTRACT

In a tension adjusting device for an engine accessory driving belt by tightening a bolt 7 threaded into an engine block 8, a fulcrum shaft 6 is fixed. A tension pulley 1 is rotatably supported by a pulley arm 2 pivotally supported about the fulcrum shaft 6. A regulating force of a hydraulic auto-tensioner is applied to the pulley arm 2 to press the tension pulley against the belt B. A washer 10 is disposed between a boss 3 formed on the pulley arm 2 and the head 7a of the bolt 7. The washer 10 has an outer cylindrical portion 11 covering one end of the boss 3. A slinger 12 is mounted on the end of the boss 3 to define a labyrinth 13 between the slinger 12 and the cylindrical portion 11, thereby preventing entry of muddy water and dust into the bearing portion pivotally supporting the pulley arm 2.

1 Claim, 4 Drawing Sheets

U.S. PATENT DOCUMENTS

| | | | | |
|---|---|---|---|---|
| 621,741 | A * | 3/1899 | Blackburn | 384/416 |
| 716,496 | A * | 12/1902 | Tolles | 384/416 |
| 1,892,845 | A * | 1/1933 | McGrath | 16/30 |
| 1,911,866 | A * | 5/1933 | Wylie | 267/269 |
| 1,943,158 | A * | 1/1934 | Booth | 301/110.6 |
| 2,349,281 | A * | 5/1944 | Kendall | 384/547 |
| 2,639,954 | A * | 5/1953 | Potter | 384/484 |
| 3,072,448 | A | 1/1963 | Melton et al. | |
| 3,139,311 | A | 6/1964 | Melton et al. | |
| 3,893,674 | A * | 7/1975 | Paradine | 277/423 |
| 4,029,366 | A * | 6/1977 | Baylor | 305/104 |
| 4,036,335 | A * | 7/1977 | Thompson et al. | 188/282.9 |
| 4,093,324 | A * | 6/1978 | Carrigan | 384/480 |
| 4,101,180 | A * | 7/1978 | Anderson et al. | 384/418 |
| 4,183,509 | A * | 1/1980 | Nishikawa et al. | 267/218 |
| 4,199,052 | A * | 4/1980 | Morris | 198/500 |
| 4,433,963 | A * | 2/1984 | Shimano | 474/80 |
| 4,464,146 | A * | 8/1984 | Arthur | 474/133 |
| 4,575,365 | A * | 3/1986 | Nagano | 474/80 |
| 4,639,149 | A * | 1/1987 | Bras et al. | 384/416 |
| 4,670,000 | A * | 6/1987 | Nagano | 474/80 |
| 4,743,034 | A * | 5/1988 | Kakabaker et al. | 277/420 |
| 4,972,939 | A * | 11/1990 | Uttke et al. | 198/501 |
| 5,156,443 | A * | 10/1992 | Ide | 301/1 |
| 5,188,214 | A * | 2/1993 | Uttke et al. | 198/501 |
| 5,211,485 | A * | 5/1993 | Hoshino | 384/296 |
| 5,228,700 | A * | 7/1993 | Biesold et al. | 277/421 |
| 5,261,528 | A * | 11/1993 | Bouchal | 198/842 |
| 5,419,642 | A * | 5/1995 | McLarty | 384/486 |
| 5,560,715 | A * | 10/1996 | Mosby | 384/477 |
| 5,711,731 | A * | 1/1998 | Fukuda | 474/79 |
| 5,726,511 | A * | 3/1998 | Kusase et al. | 310/90 |
| 5,791,876 | A * | 8/1998 | Moser | 416/170 R |
| 5,828,150 | A * | 10/1998 | Obara | 310/90 |
| 5,871,286 | A * | 2/1999 | Kern et al. | 384/280 |
| 5,952,753 | A * | 9/1999 | Obara | 310/90 |
| 5,964,674 | A * | 10/1999 | Serkh et al. | 474/109 |
| 6,017,048 | A * | 1/2000 | Fritschen | 280/281.1 |
| 6,036,612 | A * | 3/2000 | Katogi et al. | 474/110 |
| 6,076,647 | A * | 6/2000 | Agnoff | 193/37 |
| 6,103,673 | A * | 8/2000 | Sumiejski et al. | 508/186 |
| 6,170,832 | B1 * | 1/2001 | Ernst | 277/412 |
| 6,206,182 | B1 * | 3/2001 | Wilson et al. | 198/842 |
| 6,209,702 | B1 * | 4/2001 | Agnoff | 193/37 |
| 6,234,929 | B1 * | 5/2001 | Rasche | 474/110 |
| 6,241,257 | B1 * | 6/2001 | Hauck et al. | 277/637 |
| 6,354,115 | B1 * | 3/2002 | Zahn | 68/23.7 |
| 6,357,926 | B1 * | 3/2002 | Hauck et al. | 384/546 |
| 6,458,055 | B1 * | 10/2002 | Bellamy-Booth | 474/135 |
| 6,609,988 | B1 * | 8/2003 | Liu et al. | 474/133 |
| 6,676,548 | B2 * | 1/2004 | Fujiwara | 474/70 |
| 7,438,248 | B2 * | 10/2008 | Tao | 242/246 |
| 2001/0014189 | A1 * | 8/2001 | Lukezich | 384/416 |
| 2005/0255954 | A1 * | 11/2005 | Ishikawa et al. | 474/152 |

FOREIGN PATENT DOCUMENTS

| | | |
|---|---|---|
| DE | 198 45 710 | 4/2000 |
| JP | 61-184153 | 11/1986 |
| JP | 3-11154 | 2/1991 |
| JP | 5-52409 | 7/1993 |
| JP | 6-10645 | 2/1994 |
| JP | 10-169759 | 6/1998 |
| JP | 10-299846 | 11/1998 |
| JP | 10-306860 | 11/1998 |

OTHER PUBLICATIONS

Supplementary European Search Report issued Jul. 14, 2009 in European application 04 80 7177, which is a counterpart to the present application.

Japanese Notice of Reasons for Rejection issued Oct. 13, 2009 in the corresponding Japanese Patent Application No. 2003-418061(with partial English translation).

\* cited by examiner

TENSION ADJUSTING DEVICE FOR ENGINE ACCESSORY DRIVING BELT

TECHNICAL FIELD

This invention relates to a tension adjusting device for a belt for driving engine accessories such as an alternator and a water pump.

BACKGROUND ART

Japanese patent publication 10-299846A discloses a conventional tension adjusting device for an engine accessory driving belt. Like the belt tension adjusting device according to the present invention, which is shown in FIG. 1, this conventional tension adjusting device includes a pulley arm 2 pivotally mounted on an engine block, a tension pulley 1 rotatably mounted on the pulley arm 2 so as to be in contact with the slack side of the belt B, and a hydraulic auto-tensioner 20 for applying a regulating force to the pulley arm 2, thereby pressing the tension pulley 1 against the belt B. The hydraulic auto-tensioner 20 includes a built-in hydraulic damper for damping a pressing force applied to the pulley arm 2 from the belt B through the tension pulley 1.

In the conventional arrangement, as shown in FIG. 5, the pulley arm 2 has a boss 3 at its end in which a shaft inserting hole 60 is formed to extend along the central axis of the boss 3. A pair of tubular slide bearings 61 each having a flange 61a at one end thereof are pressed into the shaft insertion hole 60. A fulcrum shaft 62 is further inserted in the slide bearings 61. The fulcrum shaft 62 has a small-diameter threaded shaft portion 63 at its front end which is threaded into a threaded hole 65 formed in the engine block 64 and tightened to support the pulley arm 2.

Seal grooves 66 are formed at both ends of the fulcrum shaft 62. O-rings 67 are fitted in the respective seal grooves 66 and each elastically in contact with the inner periphery of one of the pair of slide bearings 61 to prevent entry of muddy water and dust into between the contact surfaces of the slide bearings 61 and the fulcrum shaft 62.

Also, in the conventional arrangement, as shown in FIG. 6, the hydraulic auto-tensioner 20 has a coupling piece 68 formed with a bushing insertion hole 69 extending therethrough from one to the other side thereof. A tubular slide bearing 70 is pressed into the bushing insertion hole 69. A bushing 71 is inserted in the slide bearing 70. A bolt 73 is inserted through the bushing 71 and a pair of washers 72 each in abutment with one of the end surfaces of the bushing 71, and is threaded into a threaded hole 74 formed in the pulley arm 2 and tightened. The pulley arm 2 is thus coupled to the hydraulic auto-tensioner 20.

A pair of seal grooves 75 are formed in the outer periphery of the bushing 71 each near one end thereof. O-rings 76 are each received in one of the seal grooves 75 and elastically in contact with the inner periphery of the slide bearing 70 to prevent entry of muddy water and dust into between the contact surfaces of the slide bearing 70 and the bushing 71.

In the supporting structure of the pulley arm 2 of the above-described conventional belt tension adjusting device, and the coupling structure for coupling the pulley arm 2 to the hydraulic auto-tensioner 20, when the belt B vibrates at high speed while the engine is running, the pulley arm 2 pivots about the fulcrum shaft 62 at high speed, and the pulley arm 2 and the hydraulic auto-tensioner 20 also pivot relative to each other about their coupling portions at high speed. Thus, by contact with the slide bearings 61 and 70, the O-rings 67 and 76 tend to become worn and suffer deterioration in sealability, thereby making long use of the entire device difficult.

Also, in order to mount the O-rings 67 and 76, the seal grooves 66 and 75 have to be formed. In order to optimally control the interference of the O-rings 67 and 76, such seal grooves 66 and 75 have to be finished with precision, so that the manufacturing cost tends to be high.

SUMMARY OF THE INVENTION

A first object of the present invention is to provide a tension adjusting device for an engine accessory driving belt which can maintain high sealability in the bearing portion pivotally supporting the pulley arm for a long period of time, and which can be manufactured at a low cost.

A second object of the present invention is to provide a tension adjusting device for an engine accessory driving belt which can maintain high sealability in the coupling portion for coupling the pulley arm to the hydraulic auto-tensioner for a long period of time, and which can be manufactured at a low cost.

In order to achieve the first object, according to a first aspect of the invention, there is provided a tension adjusting device for an engine accessory driving belt comprising a tension pulley configured to be brought into contact with the engine accessory driving belt, a pivotable pulley arm supporting the tension pulley and having a boss at one end thereof, the boss being formed with a shaft insertion hole, a tubular fulcrum shaft mounted in the shaft insertion hole, a bolt axially extending through the fulcrum shaft and configured to be brought into threaded engagement with an engine block and tightened to fix the fulcrum shaft to the engine pulley, thereby pivotally supporting the pulley arm, and a hydraulic auto-tensioner for applying a regulating force to the pulley arm, thereby pressing the tension pulley against the belt, characterized in that a washer is disposed between a head of the bolt and an end surface of the boss, the washer having a cylindrical portion covering an end portion of the boss including the end surface, and that a slinger is mounted on the end portion of the boss, the cylindrical portion of the washer and the slinger defining a labyrinth therebetween.

In order to achieve the second object, according to a second aspect of the invention, there is provided a tension adjusting device for an engine accessory driving belt comprising a tension pulley configured to be brought into contact with the engine accessory driving belt, a pivotable pulley arm supporting the tension pulley, a hydraulic auto-tensioner for applying a regulating force to the pulley arm, thereby pressing the tension pulley against the belt, the auto-tensioner having at one end thereof a coupling piece formed with a bushing insertion through hole extending between two sides thereof, a tubular bushing inserted in the bushing insertion through hole, and a bolt inserted through the bushing and brought into threaded engagement with the pulley arm and tightened to fix the bushing to the pulley arm, thereby pivotally coupling the one end of the hydraulic auto-tensioner to the pulley arm, characterized in that two washers are disposed between opposed surfaces of the bushing and the pulley arm and between opposed surfaces of the bushing and a head of the bolt, respectively, each of the washers having an outer cylindrical portion extending toward the coupling piece, and that the coupling piece has two annular protrusions each formed at one of two open ends of the bushing insertion through hole, the cylindrical portion of each of the washers and the corresponding one of the annular protrusions defining a labyrinth therebetween.

In the tension adjusting device for an engine accessory driving belt according to the first aspect of the invention, the labyrinth prevents the entry of muddy water and dust into the bearing portion about which the pulley arm pivots. Because the labyrinth is a non-contact seal, it maintains its sealing function for a long period of time. Since this seal is simple in structure, the entire device can be manufactured at a low cost.

In the tension adjusting device for an engine accessory driving belt according to the second aspect of the invention, the labyrinth prevents the entry of muddy water and dust into the coupling portion through which the pulley arm and the hydraulic auto-tensioner are pivotally coupled together. Because the labyrinth is a non-contact seal, it maintains its sealing function for a long period of time as in the first aspect of the invention. Also, since this seal is simple in structure, the entire device can be manufactured at a low cost.

DETAILED DESCRIPTION OF THE INVENTION

Figure 1:
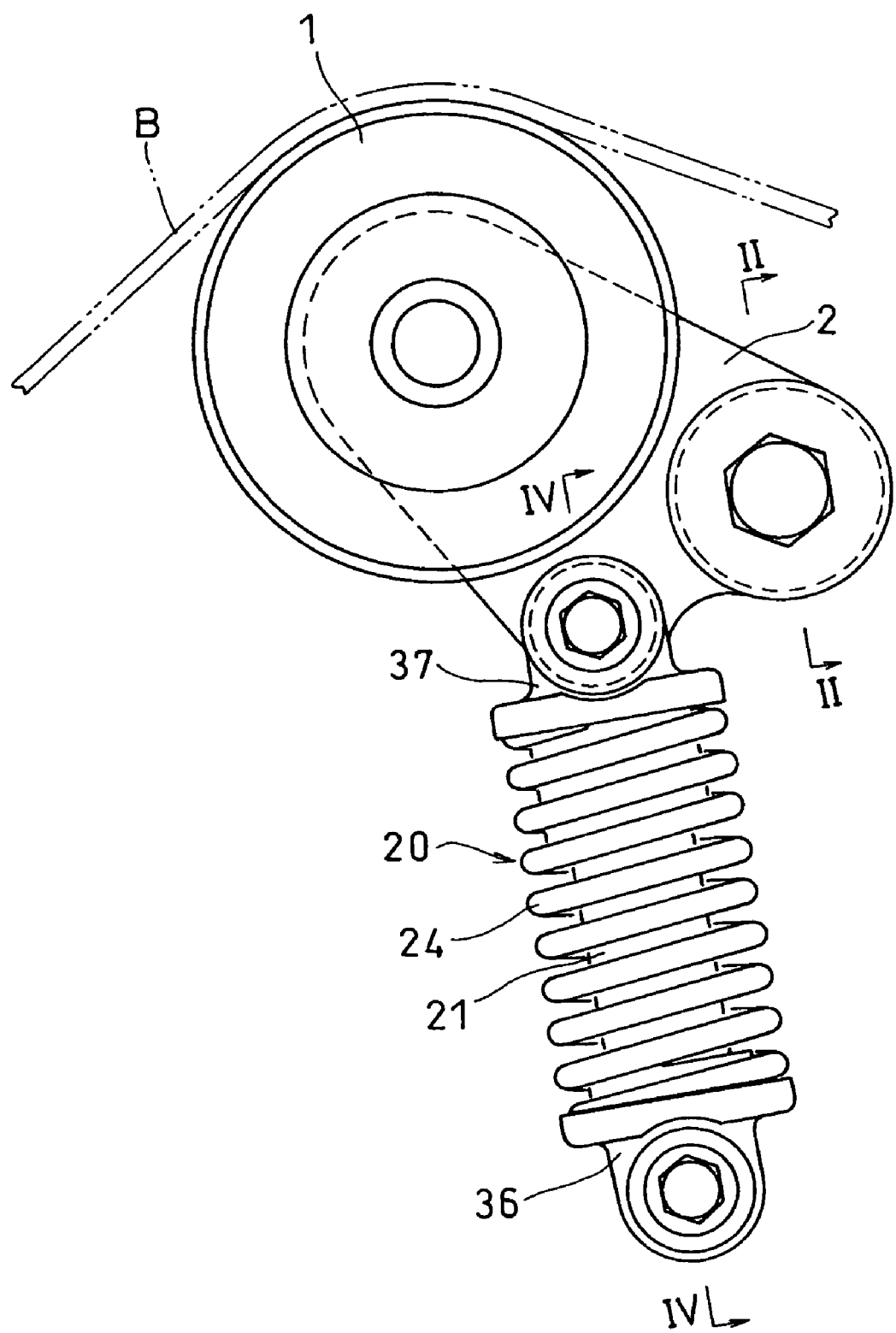
FIG. 1 is a front view of a tension adjusting device for an engine accessory driving belt embodying the present invention.
Figure 2:
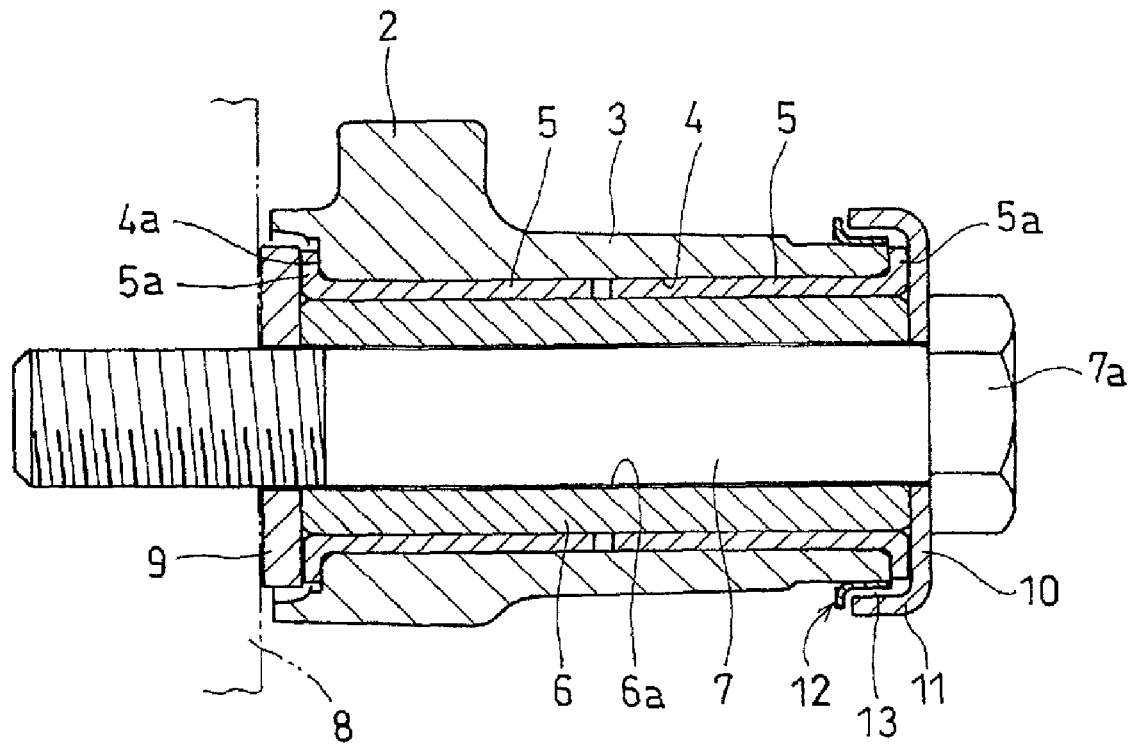
FIG. 2 is a sectional view taken along line II-II of FIG. 1.
Figure 3:
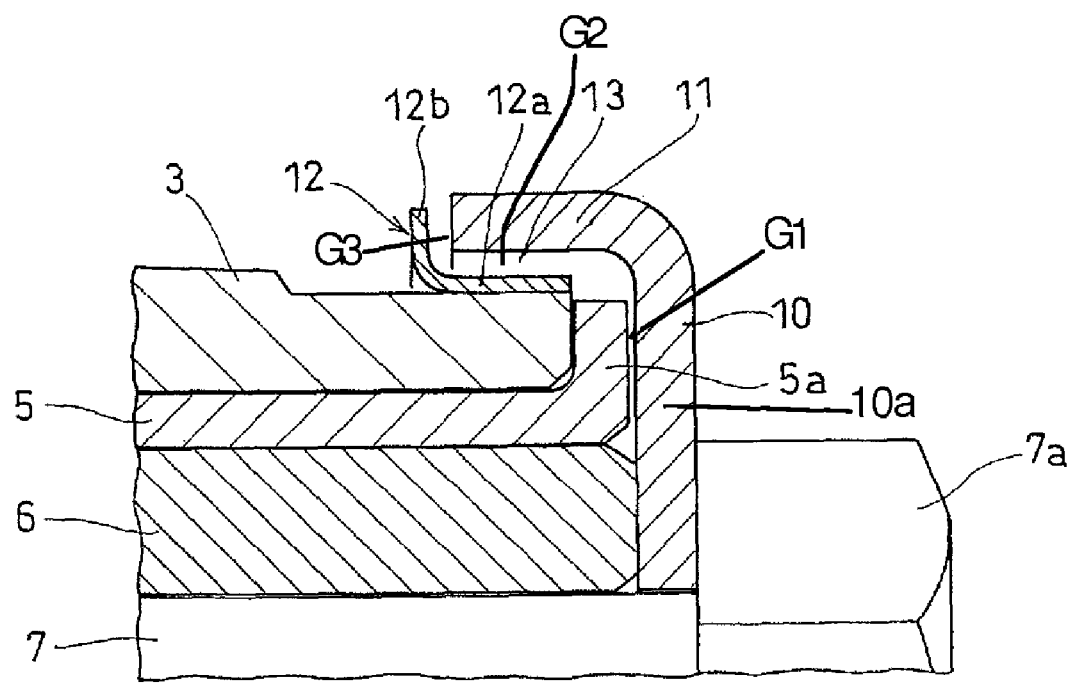
FIG. 3 is a partial enlarged sectional view of FIG. 2.

Now the embodiments of the present invention are described with reference to FIGS. 1 to 4. As mentioned above, FIG. 1 shows the tension adjusting device for a belt for driving engine accessories according to the present invention. FIGS. 2 and 3 show a bearing portion for pivotally supporting a pulley arm 2. As shown in FIGS. 2 and 3, the pulley arm 2 is provided with a boss 3 protruding from both sides thereof. The boss 3 is formed with a shaft receiving hole 4 comprising a stepped hole. A shoulder 4a is formed on the inner periphery of the shaft receiving hole 4 at one end thereof.

A pair of tubular slide bearings 5 are pressed into the shaft receiving hole 4. Each slide bearing 5 has a flange 5a at one end thereof. The flange 5a of one slide bearing 5 abuts the shoulder 4a of the shaft receiving hole 4, and the flange 5a of the other slide bearing 5 abuts the other end of the boss 3.

A tubular fulcrum shaft 6 is inserted in the pair of slide bearings 5. The fulcrum shaft 6 is fixed to an engine block 8 by tightening a bolt 7 inserted through a central hole 6a thereof. The fulcrum shaft 6 is fixed to the engine block 8 with washers 9 and 10 in abutment with both ends thereof so that the pulley arm 2 is pivotable about the fulcrum shaft 6.

The washer 10 is disposed between a head 7a of the bolt 7 and an end surface of the fulcrum shaft 6. The washer 10 has a disk portion 10a axially facing flange 5a across a gap G1, and an outer cylindrical portion 11 covering the other end of the boss 3. A slinger 12 is mounted on the outer periphery of the boss 3 at the other end thereof. The slinger 12 comprises a cylindrical portion 12a pressed onto the other end of the boss 3 and radially facing the outer cylindrical portion 11 of the washer 10 across a gap G2, and a flange 12b formed at one end of the cylindrical portion 12a and axially facing an axially-facing end surface of the outer cylindrical portion 11 of the washer 10 across a gap G3. A labyrinth 13 is formed between the slinger 12 and the washer 10 by the gaps G1, G2, and G3 that, as shown, are in communication with each other.

By mounting the slinger 12 having the flange 12b on the other end of the boss 3 to form the labyrinth 13 between the slinger 12 and the washer 10, it is possible to prevent entry of muddy water and dust into the contact portion between the fulcrum shaft 6 and the slide bearings 5. The flange 12b of the slinger 12 prevents the entry of any muddy water that may flow along the surface of the pulley arm 2 and drip onto the bearing portion into the labyrinth 13.

Because the labyrinth 13 is a non-contact seal, it maintains its sealing function and prevents entry of muddy water and dust for a long period of time even if the pulley arm 2 pivots about the fulcrum shaft 6 at a high speed. Since the sealing structure is simple, the entire device can be manufactured at a low cost.

Figure 4:
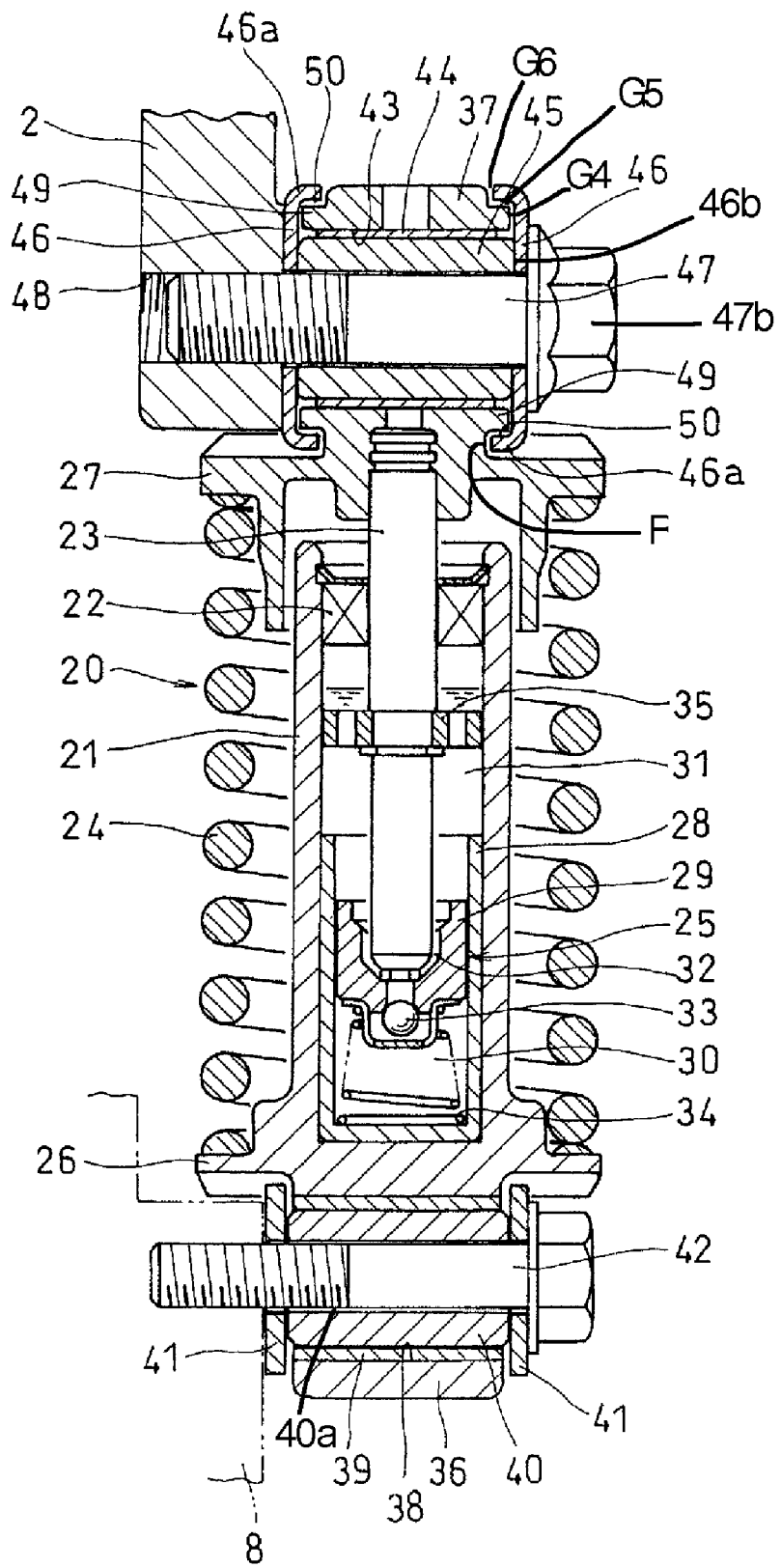
FIG. 4 is a sectional view taken along line IV-IV of FIG. 1.
Figure 5:
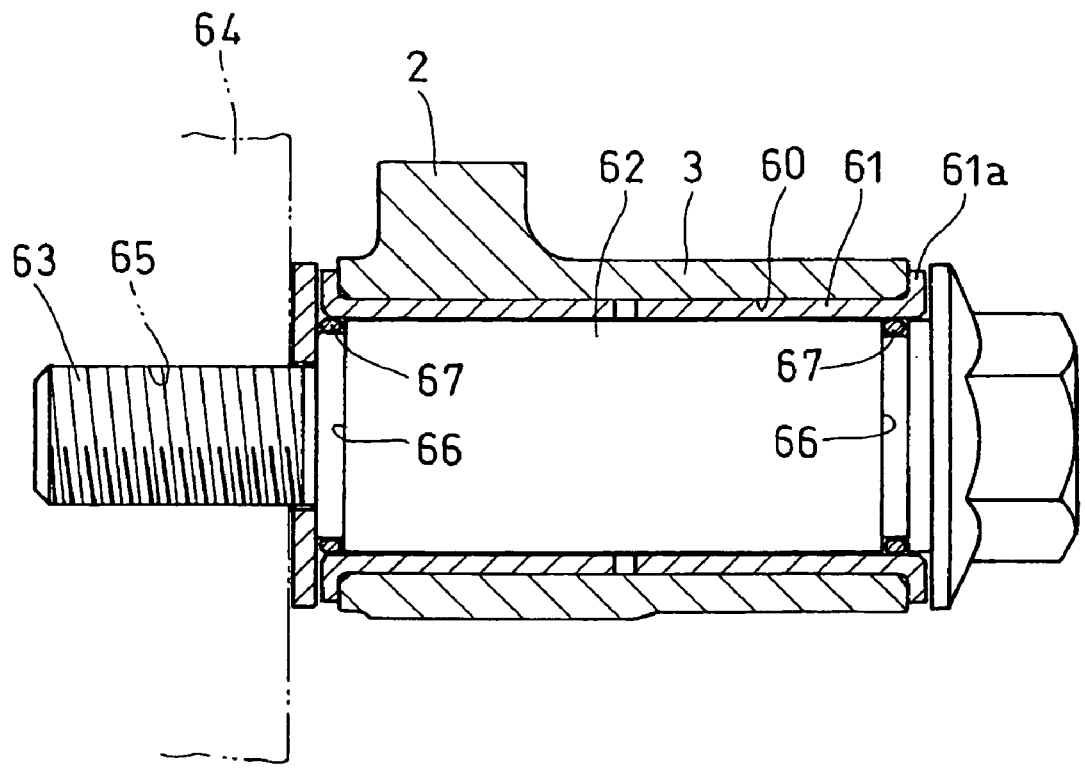
FIG. 5 is a sectional view of a conventional support structure for a pulley arm.
Figure 6:
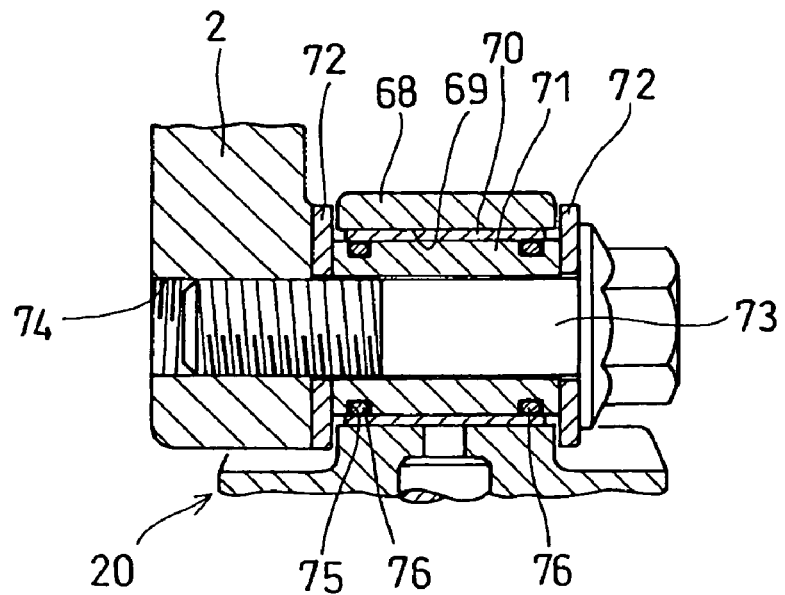
FIG. 6 is a sectional view of a conventional coupling structure for coupling a pulley arm to a hydraulic auto-tensioner.

FIG. 4 shows a hydraulic auto-tensioner 20 for applying a regulating force to the pulley arm 2. The auto-tensioner 20 comprises a cylinder 21 made of an aluminum alloy and filled with hydraulic oil, an oil seal 22 sealing the top opening of the cylinder 21 with air trapped in the cylinder 21 on the hydraulic oil, a rod 23 slidably extending through the oil seal 22, a return spring 24 biasing the rod 23 outwardly of the cylinder 21, and a hydraulic damper 25 for dampening the pressing force applied to the rod 23.

The return spring 24 is provided around the cylinder 21 with one end thereof supported by a flange 26 provided on the outer periphery of the cylinder at the bottom end thereof and the other end pressed against a spring washer 27 mounted to the top end of the rod, thereby biasing the rod 23 outwardly of the cylinder 21.

The hydraulic damper 25 includes a plunger 29 slidably mounted in a sleeve 28 having a closed bottom to define a pressure chamber 30 and a reservoir chamber 31 in the cylinder 21. The plunger 29 is formed with a passage 32 through which the pressure chamber 30 communicates with the reservoir chamber 31. The hydraulic damper 25 further includes a check valve 33 for opening and closing the passage 32, and a plunger spring 34 mounted in the pressure chamber 30 and pressing the plunger 29 against the bottom of the rod 23.

The check valve 33 closes the passage 32 when the pressure in pressure chamber 30 exceeds the pressure in the reservoir chamber 31.

The auto-tensioner further includes a wear ring 35 supporting a mid-portion of the rod 23 and movable up and down together with the rod 23, while being guided along the inner wall of the cylinder 21.

As shown in FIG. 4, a coupling piece 36 provided at the bottom end of the cylinder 21 is pivotally supported by the engine block 8, and a coupling piece 37 provided on the spring washer 27 at the top end of the rod 23 is coupled to the pulley arm 2, thereby mounting the hydraulic auto-tensioner 20 in position.

With the auto-tensioner 20 thus mounted, when the belt B slackens, the return spring 24 pushes the rod 23 out of the cylinder 21, thus pivoting the pulley arm 2 to press the tension pulley 1 against the belt B. The belt B is thus re-tensioned.

When the tension of the belt B increases, a pressing force is applied to the rod 23 through the tension pulley 1 and the pulley arm 2. The pressing force is dampened by the hydraulic damper 25.

When the pressing force exceeds the spring force of the return spring 24, the pressure in the pressure chamber 30 exceeds the pressure in the reservoir chamber 31, so that the passage 32 is closed by the check valve 33. Thereafter, hydraulic oil in the pressure chamber 30 gradually leaks through a small gap between the sliding surfaces of the plunger 29 and the closed-bottomed sleeve 28 into the reservoir chamber 31, allowing the rod 23 to retract until the force of the return spring 24 balances with the pressing force. The tension of the belt B is thus kept constant.

The coupling piece 36 provided at the bottom end of the cylinder 21 is formed with a through hole 38 extending between both sides thereof. A tubular slide bearing 39 is pressed in the through hole 38. A bushing 40 is inserted in the slide bearing 39. A bolt 42 is inserted through a pair of washers 41 in abutment with the respective ends of the bushing 40 and a central bore 40a formed in the bushing 40, and threaded into the engine block 8 and tightened to fix the bushing 40 to the engine block 8 and thus to couple the hydraulic auto-tensioner 20 to the engine block 8.

The coupling piece 37 of the spring washer 27 mounted on the top end of the rod 23 is formed with a bushing insertion through hole 43 extending between both sides thereof. A tubular slide bearing 44 is pressed in the hole 43. A tubular bushing 45 is inserted in the slide bearing 44. A bolt 47 is inserted through the bushing 45 and a pair of washers 46 in abutment with the respective ends of the bushing 45, and threaded into a threaded hole 48 formed in the pulley arm 2 and tightened to sandwich the bushing 45 between the head 47a of the bolt 47 and the pulley arm 2, thereby coupling the auto-tensioner 20 to the pulley arm 2.

The coupling piece 37 has annular protrusions 49 formed at the respective open ends of the bushing insertion hole 43 to extend toward the respective washers 46 and to define recesses R radially outside the annular protrusions 49. The washers 46 are each formed with a disk portion 46b, and an outer cylindrical portion 46a covering the corresponding annular protrusion 49, thereby defining a labyrinth 50 including gap G4 (between the disk portion 46b and an axial end surface of the annular protrusion 49), gap G5 (between the cylindrical portion 46a and a radially outer surface of the annular protrusion 49), and gap G6 (between an axially-facing bottom of recess R and an axially-facing end surface at the distal end of the cylindrical portion 46a).

By providing each of the washers 46 with the outer cylindrical portion 46a, which covers the annular protrusion 49, thus defining the labyrinth 50 therebetween, it is possible to prevent entry of muddy water and dust into between the contact surfaces of the slide bearing 44 and the bushing 45.

Since the labyrinth 50 is a non-contact seal, even when the pulley arm 2 and the coupling piece 37 pivot relative to each other, it maintains its sealing function and prevents entry of muddy water and dust for a long period of time.

The seal structure, which consists of the annular protrusions 49 of the coupling piece 37 and the outer cylindrical portions 46a of the washers 46, is extremely simple and thus can be manufactured at a low cost.

The coupling piece 36 at the bottom end of the cylinder 21 may be coupled to the engine block 8 using the coupling structure through which the pulley arm 2 is coupled to the coupling piece 37 at the top end of the rod 23.

The invention claimed is:

1. A tension adjusting device for an engine accessory driving belt, comprising:

a tension pulley configured to be brought into contact with the engine accessory driving belt;

a pivotable pulley arm supporting said tension pulley and having a boss at one end thereof, said boss having an end surface and being formed with a shaft insertion hole which opens through said end surface of said boss;

a slide bearing pressed in said shaft insertion hole and having at one end thereof a flange in abutment with said end surface of said boss;

a tubular fulcrum shaft mounted in said slide bearing;

a bolt axially extending through said fulcrum shaft and configured to be brought into threaded engagement with an engine block, thereby pivotally supporting said pulley arm;

a hydraulic auto-tensioner for applying a regulating force to said pulley arm, thereby pressing said tension pulley against the belt;

a washer comprising a disk portion and a cylindrical portion axially extending from a radially outer edge of said disk portion, said disk portion being disposed between a head of said bolt and said end surface of said boss so as to axially face said flange of said slide bearing with a first gap between said flange of said slide bearing and said disk portion of said washer, said cylindrical portion of said washer surrounding an end portion of said boss including said end surface of said boss; and a slinger comprising a cylindrical portion having first and second axial ends, said first axial end being disposed closer than said second axial end to said end surface of said boss, and a flange radially outwardly extending from said second axial end of said cylindrical portion of said slinger, said cylindrical portion of said slinger being mounted on said end portion of said boss and radially facing said cylindrical portion of said washer with a second gap between said cylindrical portion of said slinger and said cylindrical portion of said washer, said flange of said slinger axially facing an axial end surface of said cylindrical portion of said washer with a third gap between said flange of said slinger and said axial end surface of said cylindrical portion of said washer, said first, second and third gaps communicating with each other so as to define a labyrinth.

* * * * *